July 11, 1939.  A. J. FISCHER ET AL  2,165,889
AERATION OF LIQUIDS
Filed July 17, 1936   3 Sheets-Sheet 3

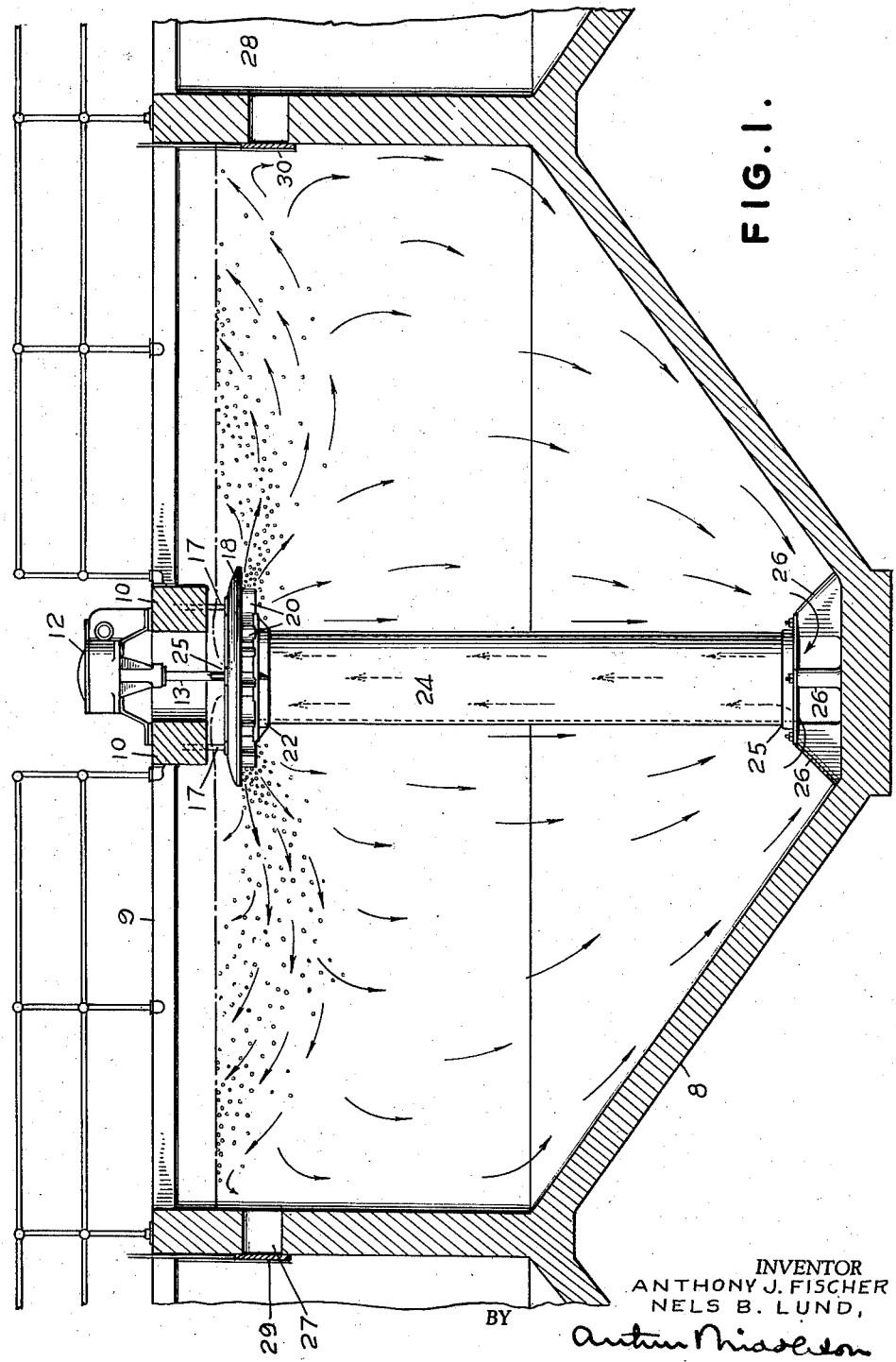

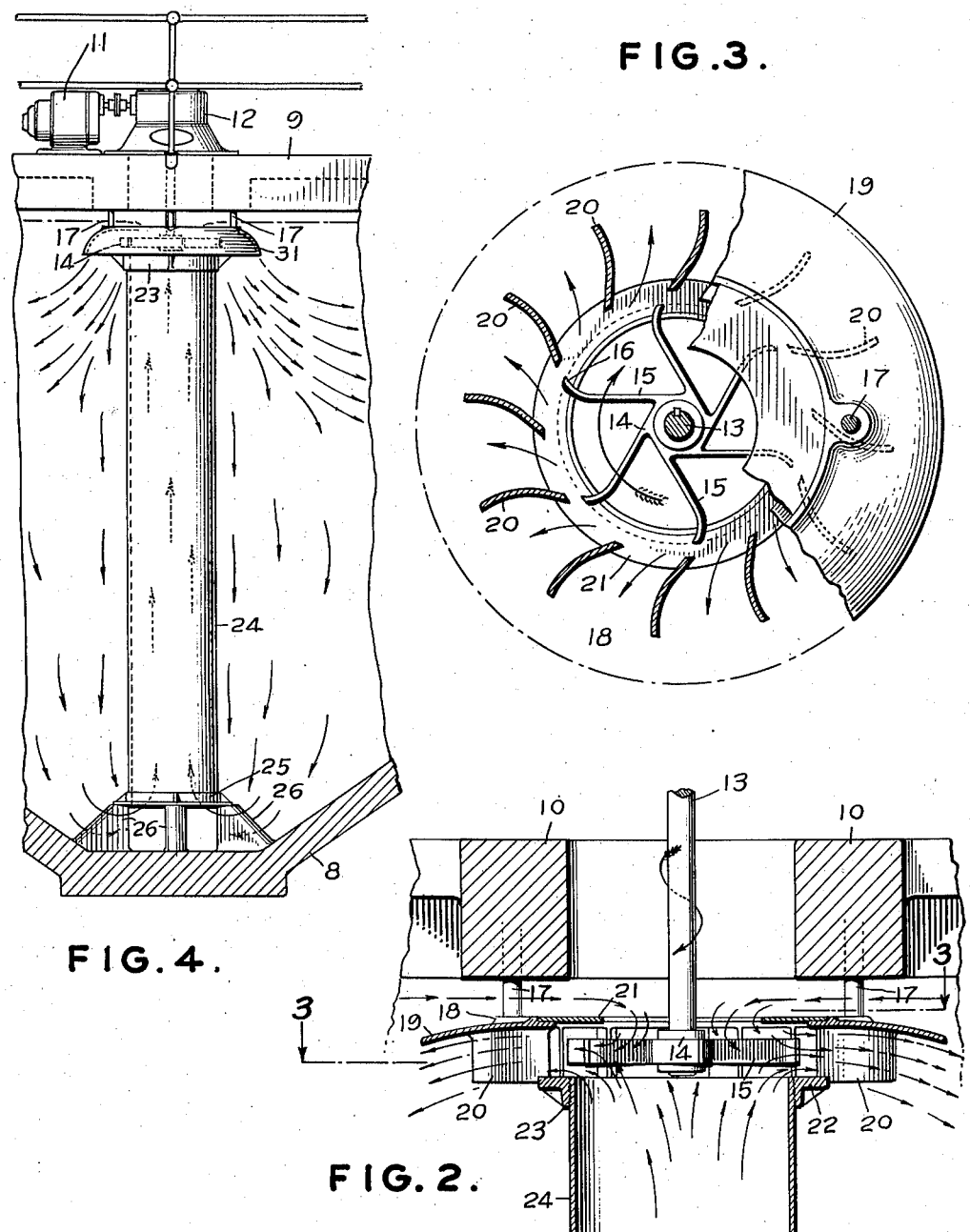

INVENTOR
ANTHONY J. FISCHER,
NELS B. LUND,
BY Arthur Middleton
ATTORNEY.

Patented July 11, 1939

2,165,889

UNITED STATES PATENT OFFICE 2,165,889

AERATION OF LIQUIDS

Anthony J. Fischer, Jackson Heights, and Nels B. Lund, Seaford, N. Y., assignors to The Dorr Company, Inc., New York, N. Y., a corporation of Delaware Application July 17, 1936, Serial No. 91,090

4 Claims. (Cl. 261—93)

This invention relates to the treatment of water and sewage, trade wastes and other polluted liquids.

One embodiment thereof revolves about improvements in methods of aerating sewage liquids by diffusing air throughout such liquids and thereby ultimately producing what is known in the art as activated sludge, and to novel apparatus for carrying out such methods.

In the activated sludge process of sewage treatment, various methods and apparatus are in vogue for accomplishing the aeration of sewage liquids, so that the aerobic forms of bacteria are stimulated and will effect the formation of activated sludge. Surface aeration, as practiced by churning or rippling the surface of a body of liquid, is not as effective or efficient as sub-surface aeration accomplished by forcing air into the liquid through submerged orifices or porous tiles. On the other hand, the latter methods require the employment of considerable power energy in compressing the air and forcing it into the tanks containing the liquid undergoing treatment.

It is an object of the present invention to aerate liquids in a more economical and efficient manner than has been accomplished heretofore.

Another object is to provide for improving the treating of sewage and analogous liquids by means of sub-surface aeration.

The present invention provides for the complete and thorough aeration of liquids by establishing in an upper portion of a body of liquid a zone of intense and continuing mechanical aeration and continually circulating liquid from the remoter portions of the body into and through said zone.

Still another object of the invention is to provide new and improved apparatus or mechanism for effecting such aeration in a highly efficient and economical manner.

With these and other objects in view, the invention consists in the methods and the construction hereinafter fully described, illustrated in the accompanying drawings, and set forth in the claims hereto appended, it being understood that various changes in the operation, form, proportion and minor details of construction, within the scope of the claims, may be resorted to without departing from the spirit of the invention or sacrificing any of the advantages thereof.

In the drawings:

Figure 1 is a vertical section through a liquid aerating tank, having therein in elevation an embodiment of the aerating device of the present invention;

Fig. 2 is an enlarged vertical section of the aerating device of Fig. 1;

Fig. 3 is a cross section of the aerating device, taken on the line 3—3 of Fig. 2;

Fig. 4 is an elevation of the aerator and associated draft tube showing a modified form of hood for the aerator;

Figure 5:
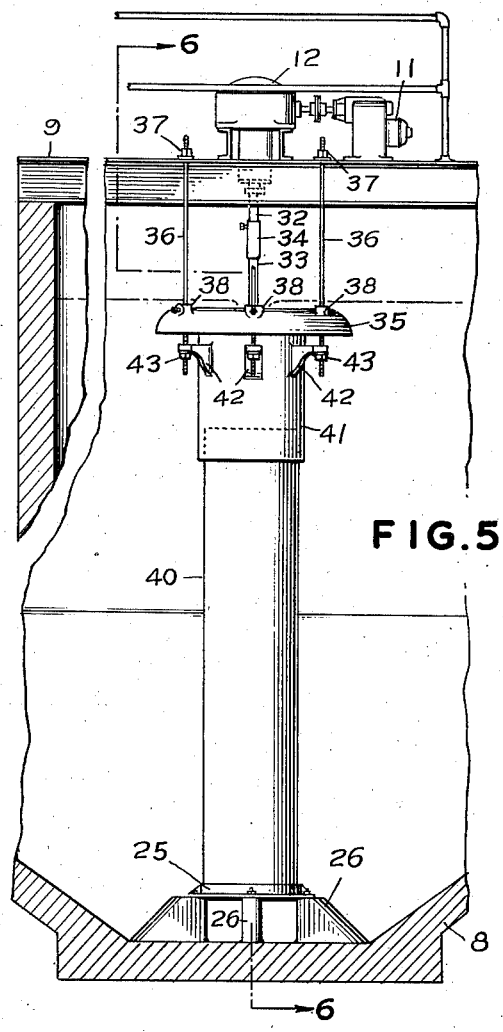
Fig. 5 is an elevation of a modification of the invention, the aerator being vertically adjustable.

Referring first to the form of the invention shown in detail in Figs. 1, 2 and 3, numeral 8 designates a tank for aerating sewage or other liquids. The tank, for the purpose of illustration, is shown to be what is designated as "hopper bottom", and is usually constructed of concrete. It is obvious, however, that the tank 8 may be of any desirable size, shape or construction and may be single or may be one of a series of intercommunicating similar tanks. A walk-way platform construction 9 extends across the top of the tank 8, supported by the side walls thereof, and supports the spaced beams 10 upon the upper surface of which is mounted a motor 11 and speed-reducing power-transmission mechanism 12. Depending from the power-transmission mechanism 12 and operatively connected therewith, is a rotatable shaft 13, which extends downwardly and terminates a short distance within the tank 8, so that its lower end will be only a short distance below the liquid level when the tank is filled. Keyed to the lower end of the shaft 13 and rotatable therewith is an impeller member 14 having a plurality of blades 15 extending radially, but offset from the center, and having slightly arcuate outer extremities, as indicated at 16. The impeller member 14 is positioned at a height so that it is just below the surface when the tank is filled with liquid.

Attached to the beams 10 in any suitable manner at the lower surfaces thereof, are depending rods or supports 17, which, at their lower extremities are attached to and serve to support a hood or hooded deflector unit designated generally as 18. The member 18 comprises an annular hood section 19, which, as can readily be seen, is bowed slightly outwardly and downwardly from its inner annulus to its outer periphery. On its under surface, the hood section 19 carries rigidly attached thereto, the spaced vertical fins 20, which are arcuate in shape, being bowed slightly in the opposite direction from that of the arcuate ends 16, of the fingers 15 of the impeller. An annular cover-plate member 21 serves to restrict the opening through the annular hood member for a purpose which will be hereinafter described. An annular collar 22 is rigidly attached to the fins or vanes 20 at their lower and inner edges. The deflector member 18, the component parts of which have just been described, is a compact unitary structure and is positioned within the upper portion of the tank with relation to the impeller 14, so that the impeller may rotate freely within the circular area defined by the inner extremities of the vanes 20.

The collar 22 carries a depending internally-screw-threaded sleeve 23, which receives and supports the correspondingly exteriorly-screw-threaded end of pipe or tube 24, which will be referred to herein as a "draft tube", for reasons which will hereinafter appear. The draft tube 24 extends downwardly within the tank and terminates a short distance from the bottom or floor thereof, and is received within and steadied by a collar 25 mounted upon steps or standards 26 on the bottom of the tank. The steps 26 may be made of metal or concrete or any suitable material, and serve as a base upon which the lower end of draft tube 24 rests, and also serve to space the lower end of the draft tube from the bottom of the tank, so that the liquid therein may have free access to the draft tube through its bottom opening as indicated by the arrows in Fig. 1 and Fig. 4.

In effecting aeration of liquids in accordance with the present invention, the tank 8 is filled with a liquid in which it is desired to diffuse air. The liquid should extend to a level just above the upper surface of the deflector 18, so that it and the associated elements are submerged a short distance under the surface. Through the motor 11, power-transmission mechanism 12 and shaft 13, the impeller 14 is caused to rotate at a relatively rapid rate in the direction indicated by the arrows in Fig. 3. As a result of this movement, the fingers 15 will cause the liquid to be forced outwardly and radially in a violent manner through the spaces between the vanes 20. At the same time, the curved hood member 19 will cause the outwardly-thrown liquid to assume a slightly downward path away from the upper surface of the body of liquid in the tank. Because of the rapid displacement of the liquid within the area occupied by the impeller 14, other liquid naturally will rush in and occupy the void occasioned by such displacement. Since the zone affected by the operation of the impeller is below the surface of the liquid, some of this influx will be from above the deflector member 18, through the opening in the annular cover plate 21, and some liquid contained within the draft tube 24 will be drawn upwardly into the voided area. Since the depth of the liquid above the deflector member 18 is not very great, the high degree of suction and the rotary movement of the water will form a vortex or whirlpool effect, as clearly indicated at 25 in Fig. 1. This condition is highly effective to draw in air from the atmosphere at the vortex 25, and a considerable volume of air is sucked in along with the water from above the deflector member. Coming in contact with the water flowing in both from above the deflector member and through the draft tube, the air is thoroughly mingled therewith and the mixture of air and water is continually thrown violently outward by the action of the impeller. The suction effect at the vortex 25 is so great that a considerable excess of air is sucked in and is thrown outwardly toward the periphery of the tank by the impeller 14, along with the displaced liquid in the form of finely divided air bubbles, as clearly indicated in Fig. 1. The air bubbles naturally tend to rise toward the surface of the liquid. The hood member 19 therefore is bowed downwardly to a degree that will cause the outwardly-displaced air and liquid to have an angle of downward travel sufficient to enable a large proportion of the air to travel substantially as far as the periphery of the tank before rising to the surface. Thus there is created and maintained substantially throughout the entire area of the upper portion of the body of liquid within the tank 8 a zone of continuing and relatively intense aeration. In actual operation these air bubbles can be seen a short distance below the surface of the liquid, and they extend substantially throughout the entire area in the upper portion of the tank.

As above explained, some of the void occasioned by the operation of the impeller 14 is occupied by the influx of liquid from that within the draft tube 24. This will occasion an upflow or updraft of liquid through the tube 24, and a consequent continual circulation of the liquid within the tank. In other words, with the impeller 14 in operation, there is a continual upflow of liquid through the draft tube, and necessarily a continual downward flow throughout the body of liquid within the tank, but outside of the draft tube, entering through the open bottom of the tube 24 and replacing the liquid drawn upwardly through the tube by the action of impeller 14. The circulation effects caused by the impeller and deflector member and the draft tube are clearly shown by the arrows in Figs. 1 and 4.

Thus, as pointed out above, there is maintained a zone of intensive aeration in an upper portion of the body of liquid, and there is also maintained at the same time a continual circulation of the liquid downwardly throughout the area of the tank and upwardly through the draft tube, so that substantially unaerated liquid in the central and lower parts of the tank, is continually carried up and subjected to the zone of intense aeration, and circulated therethrough. The sub-surface aeration in the upper portion of the tank affords a complete and thorough dispersal of air throughout that area, and the continual flow of substantially unaerated liquid into and through the aerated zone results in a rapid and highly efficient aeration of the entire contents of the tank. It is to be understood that the aeration operation above described may be conducted on the batch principle, that is, the tank may be filled with unaerated liquid and the device operated until the entire contents of the tank have been sufficiently supplied with air. The treatment may also be conducted in a continuous manner, that is, liquid may continually flow into the tank through a suitable conduit, and may continually flow out of the tank through any suitably-located discharge opening. In the latter procedure the rate of flow into the tank and the rate of discharge therefrom will be adjusted so as to allow a detention period within the tank of sufficient time to effect the desired degree of aeration. Furthermore, there may be two or more tanks equipped with the apparatus of the present invention operating in series, so that the liquid flows through the tanks from one to another. In other cases it may be desirable to construct a relatively large tank having therein a plurality of the aerating devices of this invention. For convenience in illustration, the invention is shown herein to be applied to one of a series of intercommunicating tanks. The tank 8, therefore, is provided with ports 27 and 28 in opposite sidewalls thereof for the admission and discharge of liquid, and the inflow and outflow of liquid is controlled by means of adjustable gates 29 and 30 associated with ports 27 and 28, respectively.

In Fig. 4 there will be seen a modification of the hooded deflector unit constituting a part of the present invention. In this modification the annular hood section 31 is shown to be bowed downwardly a greater distance than the form shown in Figs. 1 to 3. In this instance, the impeller 14 forces the liquid in a radial direction so that it impinges against the under side of the arcuate hood 31, which, by virtue of its considerable downward inclination, deflects the liquid and entrained air in a direction more toward the vertical and less toward the peripheral. This type of mechanism and procedure may be desirable when it is wished to force the air bubbles farther down into the body of liquid and to maintain the zone of intense aeration at a locality considerably below the surface of the liquid.

Figure 6:
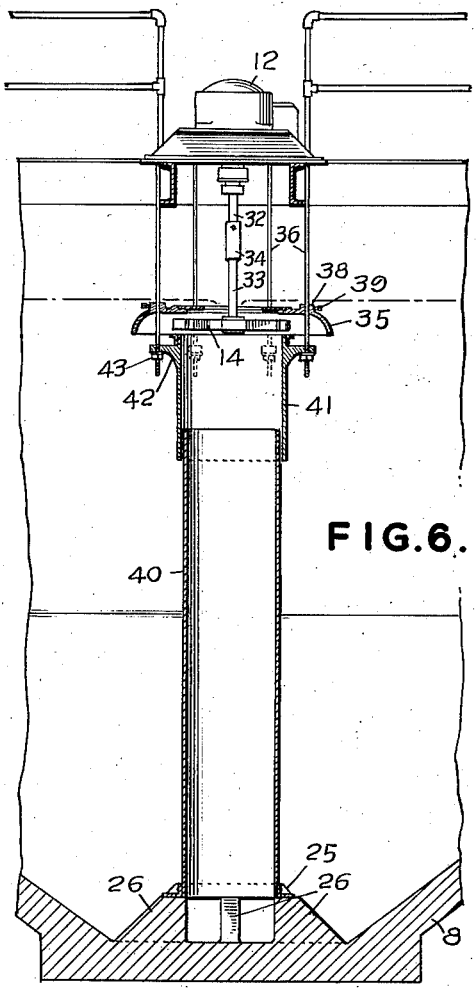
Fig. 6 is a vertical section on the line 6—6 of Fig. 5.
Figure 7:
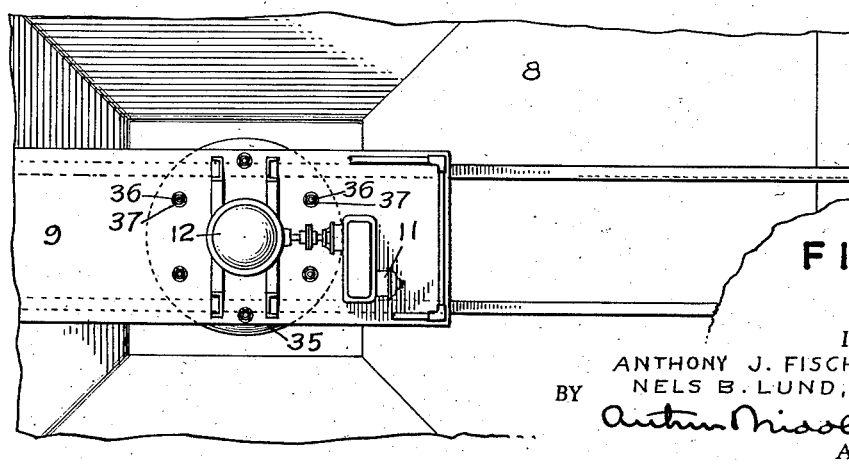
Fig. 7 is a top plan view of a sewage aerating tank having the apparatus of the present invention therein.

Figs. 5, 6 and 7 show a further modification of the invention, wherein the hooded deflector unit is adjustable by being vertically positionable within the tank. In this modification the motor 12 is provided with depending rotor 32 connected with the shaft 33 by the adjustable shaft coupling 34. The shaft 33 carries at the lower end thereof the hereinbefore-described impeller 14, and by reason of the adjustable shaft coupling 34, is vertically positionable so that the impeller 14 may operate in any of a number of horizontal planes.

There is also provided a hooded deflector unit 35 which substantially overlies and surrounds the impeller member, as hereinbefore described. The hood member 35 is provided with a plurality of radially-spaced holes or perforations, through which there extend the vertically-depending supporting members or tie-rods 36, which extend through similarly-arranged openings in the platform 9 and are externally screw-threaded at their upper ends for the reception of nuts 37, which adjustably support the tie-rods from the platform 9. Around each of the openings in the hood member 35 and projecting upwardly from the face of the hood member and surrounding each of the tie-rods 36, are sleeves 38, preferably formed integrally with the hood member 35. The sleeves 38 are pierced horizontally with the setscrews 39, which are adapted to be tightened against the tie-rods 36 and thus position the hood member 35 in any of a plurality of horizontal planes, so that the hood member may be positioned at the proper elevation with respect to the impeller 14.

In this modification of the invention the draft tube 40 is positioned at its lower extremity within the collar 25, supported on the steps 26, as hereinbefore described. At its upper end, the draft tube 40 terminates a considerable distance below the normal liquid level within the tank for a purpose which will shortly appear. A short section of tube 41 of slightly larger internal diameter than the tube 40 is provided, and the section 41 encircles the upper end of the tube 40 in telescopic arrangement therewith. The section 41 carries, preferably integrally therewith, the outstanding spaced peripheral lugs 42, which are provided with vertical openings or holes adapted to register with and receive in slidable engagement the tie-rods 36. These tie-rods extend through the openings in the lugs 42 and are externally screw-threaded at their lower ends for the reception of nuts 43. It will be seen that the section 41 is able to be adjusted vertically by telescoping over the upper end of the draft tube 40 and may be positioned at any of a plurality of elevations by adjustment of either or both sets of nuts 37 and 43.

It will thus be seen that in the present modification there is provided a mechanism for diffusing air in liquid, which is conveniently adjustable vertically, so that it may be positioned at the desired height regardless of the liquid level in the tank. By means of the adjustable shaft coupling 34, the impeller member 14 is positioned at the requisite distance below the surface of the liquid. The hood member 35 may then be positioned to properly overlie and surround the impeller and the setscrews 39 tightened against the tie-rods 36, so as to hold the hood member securely in place. By manipulating nuts 43, the tube section 41 may be positioned so that its upper extremity is in the desired spaced relationship with respect to the impeller 14. Thereafter the entire assembly, including the hood 35, tube section 41 and impeller 14, may be moved either upwardly or downwardly by manipulation of the nuts 37, and shaft coupling 34, so that the aerating device, as a whole may be supported at various heights to accommodate or compensate for changes in the normal liquid level within the tank. The apparatus of this modification operates in the same manner as that shown and described in Figs. 1 to 4; that is, liquid is forced radially outward by the impeller 14 along with air sucked in through the vortex created by the rapid rotation of the impeller, the displacement also causing the hereinbefore-described up-draft of liquid through the tube 40 and section 41. There is thus maintained the zone of intensive aeration just below the surface of the liquid, and liquid adjacent the bottom of the tank 8 is continually drawn into and forced through this aeration zone. It is to be understood, of course, that the hood member 35, in the modification just described, may be shaped in accordance with that shown in Figs. 1 to 3, or in Fig. 4, or any other shape that will effect the desired object of deflecting the outwardly-thrown liquid away from the surface of the liquid undergoing treatment.

The aerating mechanism of the present invention has been shown and described as positioned substantially at the central point with respect to the side walls of the tank. As the impeller blades force the liquid outwardly toward the periphery of the tank in a substantially radial direction, there are thus maintained a plurality of currents all radiating from the central point, resulting in the prevention or minimizing of any tendency of the liquid to short circuit from the inlet to the outlet ports.

In some instances it may be feasible and desirable to locate the aerating device off center or at a point between the center and the wall of the tank. In that case, by changing slightly the angle of the impeller blades, a circulatory current movement will be set up, resulting in substantially gyratory currents, which will carry the liquid into the influence of the impeller and the aerated zone before it has a chance to short-circuit.

We claim:
1. An apparatus for treating sewage and other liquids, comprising in combination a tank having means for feeding thereto liquid to be treated, means for conducting effluent liquid therefrom and wherein the liquid undergoing treatment is normally maintained up to a minimum level; a submerged impeller rotatable about a vertically extending axis; said impeller being positioned slightly below the normal liquid level of the tank and operative to force liquid and air outwardly and radially toward the walls of said tank, means for supporting said impeller in operative position in respect to the tank; motivating means for actuating said impeller; a draft tube leading from the lower portion of the tank to said impeller; means to support said draft tube in a substantially upright manner within the tank; an annular hood member located above the impeller for causing the liquid and air forced outwardly by the same to deviate downwardly from its radially-directed path; means for supporting said hood member in submergence; and guide vanes carried by said hood member.

2. A construction as defined in and by claim 1, according to which the draft tube is composed of two parts, the lower part of which is a tubular section and is fixedly positioned on and carried from the bottom of the tank, the upper part of which is a tubular section that is vertically adjustable with respect to the impeller.

3. An apparatus as defined in and by claim 1, according to which the rotatable impeller is carried by a vertically-extending shaft and is mounted so as to be vertically adjustable.

4. An apparatus as defined in and by claim 1, according to which the upper portion of the draft tube and the hood member are vertically adjustable on and are carried by vertically-extending carrying members common thereto.

ANTHONY J. FISCHER.
NELS B. LUND.